United States Patent
Park et al.

(10) Patent No.: US 9,621,247 B1
(45) Date of Patent: Apr. 11, 2017

(54) CONFIGURABLE ANTENNA PORT SELECTION FOR BEAM FORMING AND MIMO IN A TELECOMMUNICATIONS NETWORK

(71) Applicant: Sprint Communications Company L.P., Overland Park, KS (US)

(72) Inventors: Sungki Park, Ashburn, VA (US); Brent Scott, Gardner, KS (US); Saied Kazeminejad, Ashburn, VA (US); Brett Christian, Independence, MO (US); Senthil K. Veeraragavan, Ashburn, VA (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 14/882,981

(22) Filed: Oct. 14, 2015

Related U.S. Application Data

(63) Continuation of application No. 14/094,084, filed on Dec. 2, 2013, now Pat. No. 9,214,981.

(51) Int. Cl.
*H04B 1/44* (2006.01)
*H04B 7/06* (2006.01)
*H04B 7/0413* (2017.01)
*H04W 16/28* (2009.01)

(52) U.S. Cl.
CPC ......... *H04B 7/0617* (2013.01); *H04B 7/0413* (2013.01); *H04W 16/28* (2013.01)

(58) Field of Classification Search
CPC .... H04B 7/024; H04B 7/0413; H04B 7/0634; H04B 17/12; H04B 7/0452; H04B 7/022; H04B 7/06; H04W 24/02; H04W 88/085; H04W 72/0426; H04W 76/02
See application file for complete search history.

(56) References Cited

U.S. PATENT DOCUMENTS

| | | | | |
|---|---|---|---|---|
| 2008/0285524 | A1* | 11/2008 | Yokoyama | H04B 7/0632 370/336 |
| 2010/0234035 | A1* | 9/2010 | Fujishima | H04L 5/001 455/450 |
| 2010/0284351 | A1* | 11/2010 | Liang | H04B 7/0417 370/329 |
| 2011/0064159 | A1* | 3/2011 | Ko | H04B 7/04 375/267 |
| 2011/0183677 | A1* | 7/2011 | Oyane | H04W 88/085 455/442 |
| 2011/0274146 | A1* | 11/2011 | Huang | H01Q 5/378 375/219 |
| 2013/0343303 | A1* | 12/2013 | Kim | H04B 7/0452 370/329 |

\* cited by examiner

*Primary Examiner* — Golam Sorowar

(57) ABSTRACT

A switching device and a method and medium for using the switching device are provided. The switching device is associated with a remote radio unit (RRU) and an antenna of a base station and comprises a plurality of switching cables arranged in predetermined configurations including a single-layer beam forming configuration, a dual-layer beam forming configuration, and a MIMO configuration. In response to inputs received from UEs served by the base station, the switching device can implement the configuration best-suited to target the UEs.

20 Claims, 8 Drawing Sheets

CONFIGURABLE ANTENNA PORT SELECTION FOR BEAM FORMING AND MIMO IN A TELECOMMUNICATIONS NETWORK

CROSS REFERENCE TO RELATED APPLICATIONS

This application is a continuation of and claims priority to pending U.S. patent application Ser. No. 14/094,084 entitled "CONFIGURABLE ANTENNA PORT SELECTION FOR BEAM FORMING AND MIMO IN A TELECOMMUNICATIONS NETWORK," filed on Dec. 2, 2013. The entirety of the aforementioned application is incorporated by reference herein.

SUMMARY

A high level overview of various aspects of the invention is provided here for that reason, to provide an overview of the disclosure and to introduce a selection of concepts that are further described below in the detailed-description section below. This summary is not intended to identify key features or essential features of the claimed subject matter, nor is it intended to be used as an aid in isolation to determine the scope of the claimed subject matter.

In brief, and at a high level, this disclosure describes, among other things, a switching device associated with a base station. The switching device comprises switching cables that selectively communicatively couple radio head ports of the base station's RRU to antenna ports of the base station's antenna. The switching cables of the switching device are arranged in predetermined configurations that can be dynamically selected in order to implement single-layer beam forming, dual-layer beam forming, or MIMO transmission modes.

This disclosure also describes computer-readable media, methods, and systems for using inputs received from UEs served by the base station to select, via the switching device, between the single-layer beam forming, dual-layer beam forming, or multiple-input-multiple-output (MIMO) transmission modes. Inputs from UEs served by the base station aid in the determination of which transmission mode is implemented. For example, if most of the UEs served by the base station are located at a serving cell edge, the switching device may be instructed to implement a beam forming transmission mode in order to more effectively target the UEs. On the other hand, if most of the UEs are located close to the base station, the switching device may be instructed to implement a MIMO transmission mode. Additionally, rank indicators transmitted by UEs to the base station may be used by the base station to determine if a single-layer beam forming transmission mode should be implemented or if a dual-layer beam forming transmission mode should be implemented. For instance, if a UE transmits a rank indicator having a value of 1, indicating that channel paths are correlated, then single-layer beam forming is implemented by the switching device. If the UE transmits a rank indicator having a value of 2, indicating that channel paths are not correlated, then dual-layer beam forming is implemented by the switching device. Using a switching device to selectively switch between single-layer beam forming, dual-layer beam forming, and MIMO transmission modes enables the base station to more effectively serve UEs which improves the network subscriber's experience.

BRIEF DESCRIPTION OF THE DRAWINGS

Illustrative embodiments of the present invention are described in detail below with reference to the attached drawing figures, and wherein.

DETAILED DESCRIPTION

Figure 1:
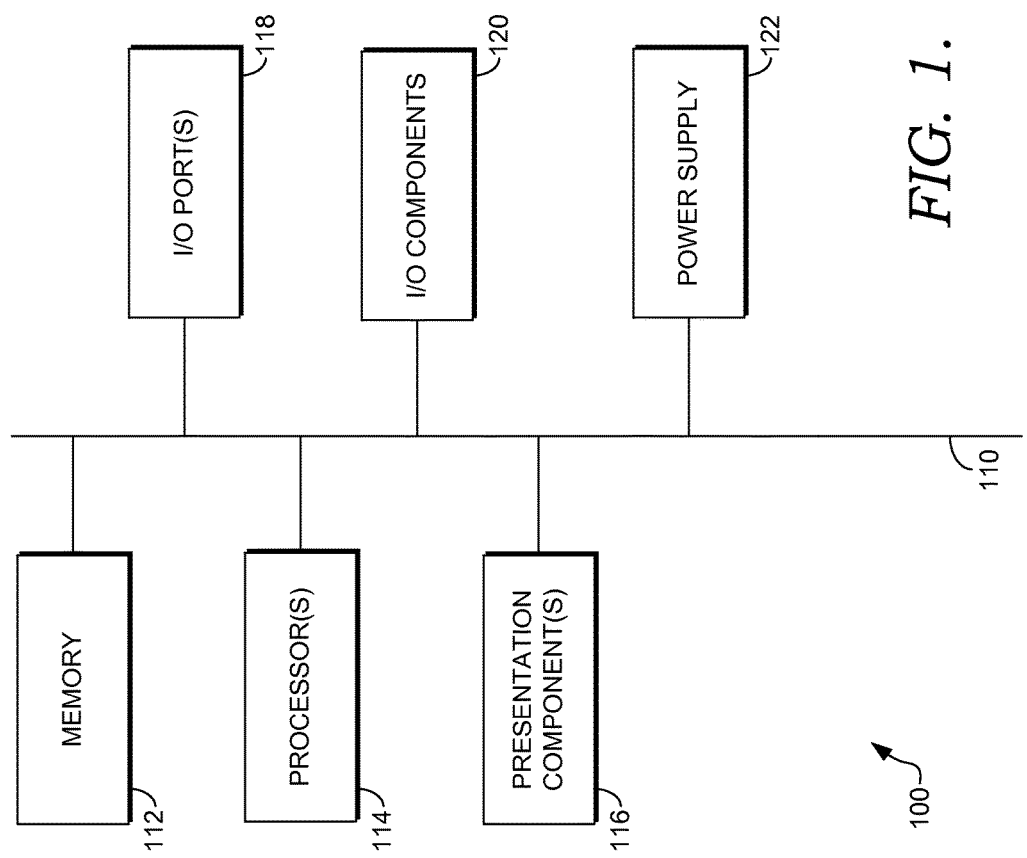
FIG. 1 depicts an exemplary mobile device according to an embodiment of the technology.

The subject matter of select embodiments of the present invention is described with specificity herein to meet statutory requirements. But the description itself is not intended to define what we regard as our invention, which is what the claims do. The claimed subject matter might be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly described.

Throughout this disclosure, several acronyms and shorthand notations are used to aid the understanding of certain concepts pertaining to the associated system and services. These acronyms and shorthand notations are intended to help provide an easy methodology of communicating the ideas expressed herein and are not meant to limit the scope of the present invention. The following is a list of these acronyms:

BBU Baseband Unit
BF Beam forming
BS Base Station
CDMA Code Division Multiple Access eNodeB Evolved Node B
GIS Geographic Information System
2GPP $2^{nd}$ Generation Partnership Project
3GPP $3^{rd}$ Generation Partnership Project
GPRS General Packet Radio Service
GSM Global System for Mobile Communications
LTE Long-Term Evolution
MIMO Multiple-Input-Multiple-Output
RF Radio-Frequency
RRU Remote Radio Unit
TM Transmission Modes
UE User Equipment
WCDMA Wideband Code Division Multiple Access Further, various technical terms are used throughout this description. An illustrative resource that fleshes out various aspects of these terms can be found in Newton's Telecom Dictionary, $27^{th}$ Edition (2012).

Embodiments of the present invention may be embodied as, among other things, a method, system, or set of instructions embodied on one or more non-transitory computer-readable or computer-storage media. Computer-readable media comprises physical storage devices and include both volatile and nonvolatile media, removable and nonremovable media, and contemplates media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to computer-storage media such as information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Examples of the present invention are directed towards a switching device associated with a RRU and an antenna of a base station. The switching device utilizes a plurality of switching cables to selectively communicatively couple radio head ports of the RRU to antenna ports of the antenna. As used throughout this disclosure, the term "communicatively couple" means to enable the propagation of a RF signal from the RRU to the antenna and from the antenna to the RRU. The switching cables are arranged in predetermined patterns or configurations that, when selected, implement single-layer beam forming, dual-layer beam forming, or MIMO transmission modes. The selection or implementation of one of the transmission modes may be dependent upon inputs received from UEs served by the base station. Additionally, the selection of one of the transmission modes may also be dependent upon such things as the topological morphology of the area served by the base station.

In one aspect, the RRU may be split into a first side carrying a set of lower-frequency channels and a second side carrying a set of higher-frequency channels. The selection of a transmission mode may be determined separately and independently for each side of the RRU. For instance, in response to inputs received by the base station from UEs served by the first side of the RRU, a MIMO transmission mode may be dynamically implemented via the switching device for the first side of the RRU. Continuing, in response to inputs received by the base station from UEs served by the second side of the RRU, a single-layer beam forming transmission mode may be dynamically implemented via the switching device for the second side of the RRU. Other combinations of transmission modes for the first and second sides of the RRU are contemplated as being within the scope of the invention.

Accordingly, in a first aspect, a switching device associated with a RRU and an antenna of a base station is provided. The switching device comprises an RRU inlet side that has a plurality of radio port connecting terminals. Each radio port connecting terminal is connected to a radio port of a RRU by a data transmission cable. The switching device further comprises an antenna inlet side having a plurality of antenna port connecting terminals. Each antenna port connecting terminal is connected to an antenna port of an antenna by a data transmission cable. The switching device also comprises a plurality of sets of switching cables, where each set of switching cables is associated with a radio port connecting terminal. Each switching cable within the set of switching cables connects the respective radio port connecting terminal to one of the plurality of antenna port connecting terminals. The plurality of sets of switching cables is configured in a single-layer beam forming configuration, a dual-layer beam forming configuration, and a MIMO configuration (the "configurations). Additionally, the switching device comprises a plurality of switching units that are associated with the plurality of sets of switching cables and are used to selectively switch between the configurations in response to one or more inputs received by the base station from UEs served by the base station.

In a second aspect, there is provided computer-storage media having computer-executable instructions embodied thereon that, when executed, perform a method of implementing a predetermined configuration of a plurality of switching cables of a switching device associated with a split remote radio unit (RRU) and an antenna of a base station in response to one or more inputs received by the base station from a plurality of UEs served by the base station. The split RRU comprises a first transmit/receive (T/R) side carrying a first set of RF channels and a second T/R side carrying a second set of RF channels. The predetermined configuration comprises at least one of a beam forming configuration or a multiple-input-multiple-output (MIMO) configuration, and the plurality of switching cables communicatively couples a plurality of radio head ports of the RRU to a plurality of antenna ports of the antenna. The method comprises determining whether the plurality of UEs is served by the first T/R side of the split RRU or by the second T/R side of the RRU. The inputs received from the plurality of UEs are monitored to determine whether the plurality of UEs is transmitting/receiving at a serving cell edge of the base station, or whether the plurality of UEs is transmitting/receiving at a location close to the base station. When it is determined that the plurality of UEs is transmitting/receiving at the serving cell edge, the beam forming configuration is implemented for the first T/R side of the split RRU when the first T/R side is serving the plurality of UEs or the second T/R side of the split RRU when the second T/R side is serving the plurality of UEs. When it is determined that the plurality of UEs is transmitting/receiving at the location close to the base station, the MIMO configuration is implemented for the first T/R side of the split RRU when it is determined that the first T/R side is serving the plurality of UEs or the second T/R side of the split RRU when the second T/R side is serving the plurality of UEs.

In a third aspect, a computerized method is carried out by at least one server having at least one processor for implementing a predetermined configuration of a plurality of switching cables of a switching device associated with a split remote radio unit (RRU) and an antenna of a base station in response to one or more inputs received by the base station from a UE served by the base station. The split RRU comprises a first T/R side carrying a first set of RF channels and a second T/R side carrying a second set of RF channels. The predetermined configuration comprises at least one of a single-layer beam forming configuration or a dual-layer beam forming configuration, and the plurality of switching cables communicatively couples a plurality of radio head ports of the RRU to a plurality of antenna ports of the antenna. The method comprises receiving a rank indicator from the UE, wherein the rank indicator comprises either a value of 1 or a value of 2. It is determined whether the UE is being served by the first T/R side of the split RRU or by the second T/R side of the split RU. When the rank indicator received from the UE has a value of 1, the single-layer beam forming configuration is implemented for the first T/R side when it is determined that the first T/R side is serving the UE and for the second T/R side when it is determined that the second T/R side is serving the UE. When the rank indicator received from the UE has a value of 2, the dual-layer configuration is implemented for the first T/R side when it is determined that the first T/R side is serving the UE and for the second T/R side when it is determined that the second T/R side is serving the UE.

Turning now to FIG. 1, a block diagram of an illustrative communications device or UE is provided and is referenced generally by the numeral 150. Although some components are shown in the singular, they may be plural. For example, the communications device 150 might include multiple processors or multiple radios, etc. As illustratively shown, the communications device 150 includes a bus 160 that directly or indirectly couples various components together including memory 162, a processor 164, a presentation component 166, a radio 168, input/output ports 170, input/output components 172, and a power supply 174.

The memory 162 might take the form of memory components previously described. Thus, further elaboration will not be provided here, only to say that the memory component 162 can include any type of medium that is capable of storing information (e.g., a database). A database can be any collection of records. In one embodiment, the memory 162 includes a set of embodied computer-executable instructions that, when executed, facilitates various aspects disclosed herein. These embodied instructions will variously be referred to as "instructions" or an "application" for short.

The processor 164 might actually be multiple processors that receive instructions and process them accordingly. The presentation component 166 includes the likes of a display, a speaker, as well as other components that can present information (such as a lamp (LED), or even lighted keyboards).

The radio 168 facilitates communication with a wireless-telecommunications-network. Illustrative wireless-telecommunications technologies include CDMA, EvDO, GPRS, TDMA, GSM, WiMax technology, LTE, LTE Advanced and the like. In some embodiments, the radio 168 might also facilitate other types of wireless communications including Wi-Fi®, Bluetooth® communications, GIS communications, and other near-field communications.

As way of background, a base station, such as an eNodeB in an LTE telecommunications-network is composed of, among other components, a broadband unit (BBU) that is connected to one or more remote radio units (RRUs). In turn, each RRU is typically connected directly to one or more antenna ports associated with an antenna located on the base station. In general, the BBU is responsible for, among other things, digital baseband signal processing. For instance, CDMA/EVDO and LTE Internet protocol (IP) packets are received from the core network (not shown) and are digitally combined by the BBU. The blended digital baseband signal is then transmitted to the RRU. Digital baseband signals received from the RRU are demodulated by the BBU and the resulting IP packets are then transmitted by the BBU to the core network.

The RRU transmits and receives wireless RF signals. The RRU converts the blended digital signal received from the BBU into an analog RF output via a digital to analog (AD) converter. The analog signal is then amplified by an amplifier in the RRU and sent out for transmission to a UE via the antenna ports of the antenna. The RF signals received from the UE via the antenna ports are amplified by the RRU and converted to digital baseband signals for transmission to the BBU.

A typical RRU comprises an 8 transmit/8 receive (8T/8R) RRU that has eight radio head ports connected to the antenna ports of the antenna. In some instances, the 8T/8R RRU is split into two 4T/4R units (a first 4T/4R side and a second 4T/4R side). By splitting the RRU into two 4T/4R units, the carrying capacity of the RRU is increased. For instance, instead of the RRU carrying a total of three channels, the first 4T/4R side can carry three lower-frequency RF channels that serve a first group of UEs, and the second 4T/4R side can carry three higher-frequency RF channels that serve a second group of UEs. As used throughout this disclosure, the term "serve" means to provide RF coverage to a UE. Because the RRU is split, four radio head ports are associated with the first 4T/4R side and the remaining four radio head ports are associated with the second 4T/4R side.

Figure 2A:
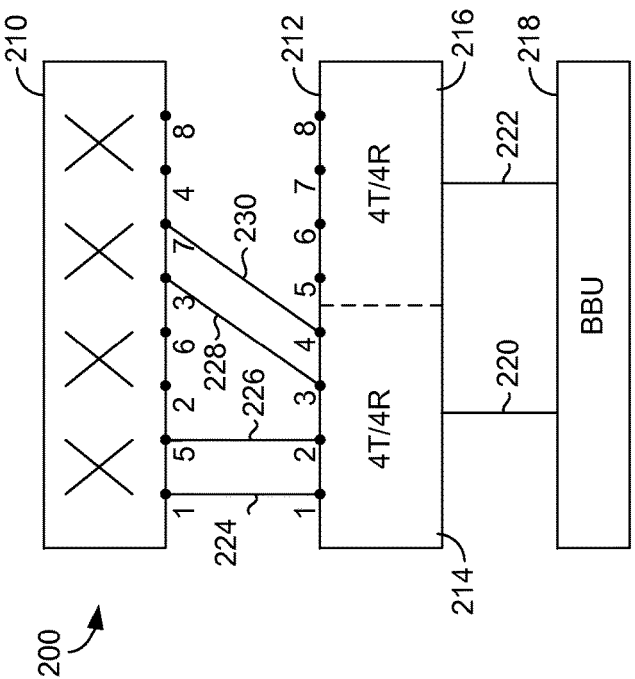
FIGS. 2A and 2B depict typical relationships between an antenna, a remote radio unit (RRU), and a baseband unit of a base station.
Figure 2B:
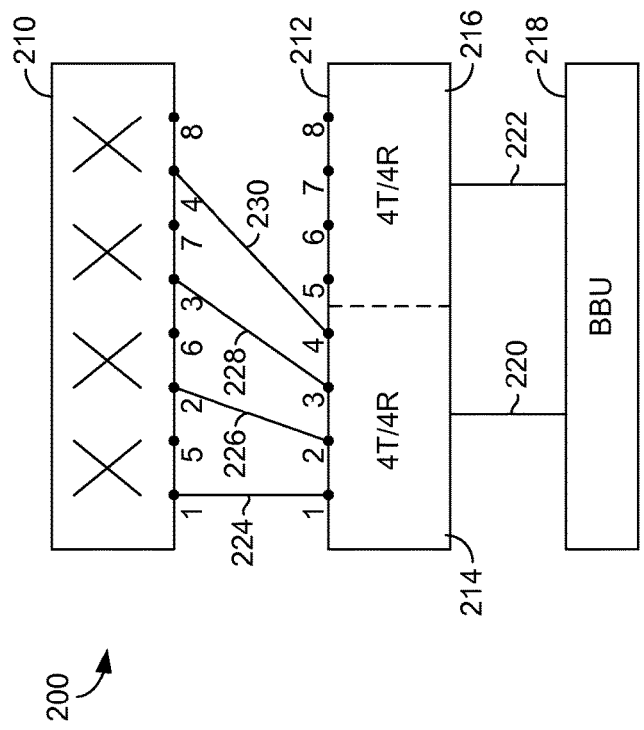

FIGS. 2A and 2B illustrate a typical arrangement of an 8-port antenna 210, a split RRU 212, and a BBU 218 and is referenced generally by the numeral 200. The BBU 218 is communicatively coupled to the RRU via transmission lines 220 and 222 where the transmission line 220 transmits, for example, the three lower-frequency channels and the transmission line 222 transmit, for example, the three higher-frequency channels. The RRU 212 is split into a first 4T/4R side 214 carrying the lower-frequency channels and a second 4T/4R side 216 carrying the higher-frequency channels. The first 4T/4R side 214 has radio head ports 1, 2, 3, and 4, and the second 4T/4R side has radio head ports 5, 6, 7, and 8. The antenna 210 comprises, in one aspect, an 8-port antenna.

Figure 3:
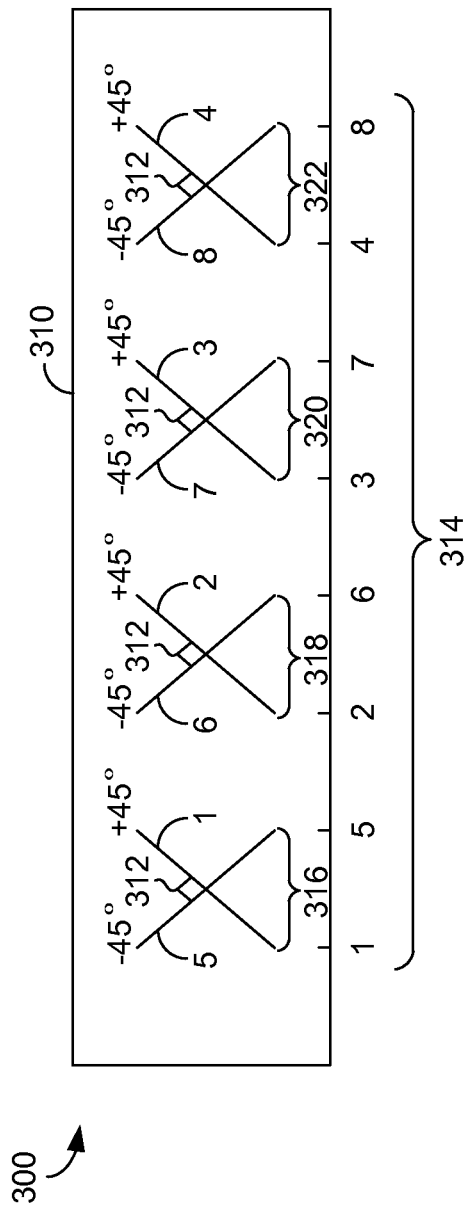
FIG. 3 depicts an exemplary illustration of an 8-port antenna suitable for practicing an embodiment of the technology.

FIG. 3, referenced generally by the numeral 300, illustrates details associated with a typical 8-port antenna 310 used in an LTE network that supports TM8 MIMO and beam forming modes. The antenna 310 comprises eight antenna elements configured into two groups, antenna group 0 and antenna group 1. Antenna group 0 comprises antenna elements 1, 2, 3, and 4, and antenna group 1 comprises antenna elements 5, 6, 7, and 8. The antenna ports, shown in FIG. 3 by the numeral 314, correspond in numbers to the antenna element with which each antenna port is associated. Antenna elements 1, 2, 3, and 4 are polarized at plus 45 degrees (+45°), and antenna elements 5, 6, 7, and 8 are polarized at minus 45 degrees (−45°). Additionally, the first group of antenna elements (antenna elements 1, 2, 3, and 4) are orthogonally cross-polarized at 90 degrees to the second group of antenna elements (antenna elements 5, 6, 7, and 8) as indicated by the numeral 312. As shown in FIG. 3, antenna element 1 is orthogonally cross-polarized to antenna element 5 and together the antenna elements comprise a first antenna column 316. Likewise, antenna element 2 is orthogonally cross-polarized with antenna element 6 and together they comprise a second antenna column 318, antenna element 3 is orthogonally cross-polarized with antenna element 7 and together they comprise a third antenna column 320, and antenna element 4 is orthogonally cross-polarized with antenna element 8 and together they comprise a fourth antenna column 322.

Each of the antenna elements within a given group (e.g., antenna group 0 or antenna group 1) are spatially separated by approximately half the RF carrier wavelength or approximately 0.50λ. This provides a high degree of antenna element correlation within a given antenna group which is good for beam forming. Since antenna group 0 is cross-polarized to antenna group 1, there is a low correlation between each of the two antenna groups, which is good for MIMO.

Additionally, the first and second antenna columns 316 and 318, and the third and fourth antenna columns 320 and 322 are each separated by approximately 0.65λ which provides good correlation between these columns. The first and third antenna columns 316 and 320, and the second and fourth antenna columns 318 and 322 are each separated by more than one wavelength causing a low correlation between these antenna columns.

Returning now to FIGS. 2A and 2B, a typical cabling arrangement between the first 4T/4R side 214 of the RRU 212 and the antenna 210 is shown. Although typical cabling arrangements are shown only for the first 4T/4R side 214 in FIGS. 2A and 2B, the cabling arrangements are equally applicable to the second 4T/4R side 216. Only one side is shown for clarity's sake. Typically the first 4T/4R side 214 is physically cabled to the antenna ports of the antenna 210 in either a MIMO or a beam forming arrangement with no ability to switch between the two without having to physically visit the base station and physically alter the cabling arrangement. The fixed cabling as shown in FIGS. 2A and 2B offers no ability to dynamically switch between transmission modes (e.g. beam forming versus MIMO) in response to changing conditions which can lead to a degradation in the network subscriber's experience.

With respect to FIG. 2A, FIG. 2A represents a first typical cabling arrangement between the first 4T/4R side 214 and the antenna 210 and is optimized for the beam forming transmission mode. In this configuration, radio head port 1 is cabled to antenna port 1 via RF transmission line 224, radio head port 2 is cabled to antenna port 2 via RF transmission line 226, radio head port 3 is cabled to antenna port 3 via RF transmission line 228, and radio head port 4 is cabled to antenna port 4 via RF transmission line 230. As discussed above with respect to FIG. 3, because the first 4T/4R side 214 is cabled to antenna elements 1, 2, 3 and 4, and because the antenna elements 1, 2, 3, and 4 are all polarized at +45° and thus correlated, this cabling configuration is optimal for beam forming.

With respect to FIG. 2B, FIG. 2B represents the other typical cabling configuration between the first 4T/4R side 214 and the antenna 210 and is optimized for the MIMO transmission mode. In this configuration, radio head port 1 is cabled to antenna port 1 via RF transmission line 224, radio head port 2 is cabled to antenna port 5 via RF transmission line 226, radio head port 3 is cabled to antenna port 3 via RF transmission line 228, and radio head port 4 is cabled to antenna port 7 via RF transmission line 230. As discussed above with respect to FIG. 3, because the antenna elements 1 and 5 and the antenna elements 3 and 7 are orthogonally cross-polarized at 90 degrees to each other and thus not correlated, this cabling configuration is optimal for MIMO.

Figure 4:
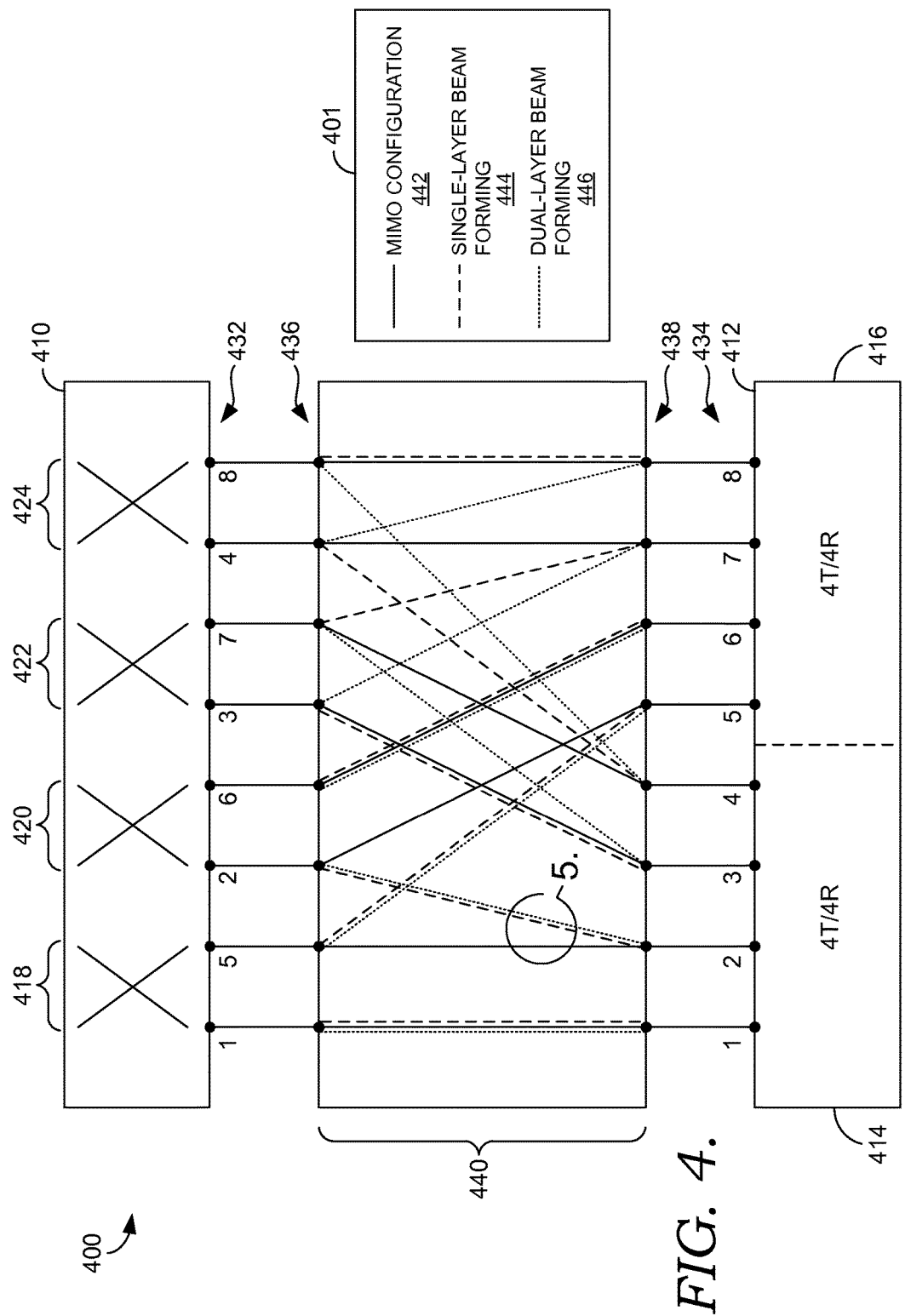
FIG. 4 depicts an exemplary switching device interposed between a remote radio unit and an antenna of a base station where the switching device comprises a plurality of switching cables configured in a single-layer beam forming configuration, a dual-layer beam forming configuration, and a MIMO configuration suitable for practicing an embodiment of the technology.

In one aspect, the present invention, as shown in FIG. 4, and as referenced generally by the numeral 400, comprises a switching device 440 that is interposed or positioned between an 8-port antenna 410, and a split RRU 412. The RRU 412 is split into a first 4T/4R side 414 carrying, for example, lower-frequency channels and having radio head ports 1, 2, 3, and 4, and a second 4T/4R side 416 carrying, for example, higher-frequency channels, and having radio head ports 5, 6, 7, and 8. The switching device 440, the antenna 410, and the split RRU 416 are all associated with a base station such as an eNodeB. The antenna 410 may be the same as the reference antenna 310 shown in FIG. 3. As indicated in FIG. 4, the antenna 410 comprises a first antenna column 418, a second antenna column 420, a third antenna column 422, and a fourth antenna column 424 similar to the first, second, third, and fourth antenna columns 316, 318, 320, and 322 of FIG. 3.

The switching device 440 comprises an antenna inlet side 436, a RRU inlet side 438, and a plurality of switching cables configured in a MIMO configuration 442, a single-layer beam forming configuration 444, and a dual-layer beam forming configuration 446 (as shown in the legend 401). The antenna inlet side 436 comprises a number of antenna port connecting terminals connected to antenna ports 432 of the antenna 410 by RF transmission lines (also known as "data transmission cables"). In one aspect, the RF transmission lines connecting the antenna port connecting terminals to the antenna ports may comprise any type of shielded cable such as a coaxial cable. The antenna port connecting terminals are numbered the same as the antenna port with which they connect. Thus, the antenna port connecting terminals and the antenna ports are numbered from left to right as 1, 5, 2, 6, 3, 7, 4, and 8.

The RRU inlet side 438 comprises a number of radio head port connecting terminals. As shown in FIG. 4, each of the radio head port connecting terminals is connected to one of the radio head ports 434 of the RRU 412 by a RF transmission line (also known as a "data transmission cable"). In one aspect, the RF transmission line may comprise any type of shielded cable such as a coaxial cable. The radio head port connecting terminals are numbered the same as the radio head port with which they connect. Thus, the radio head port connecting terminals and the radio head ports are numbered from left to right as 1, 2, 3, 4, 5, 6, 7, and 8.

As mentioned, the switching device 440 further comprises the plurality of switching cables configured in the MIMO configuration 442, the single-layer beam forming configuration 444, and the dual-layer beam forming configuration 446. The term "switching cables" is used for clarity's sake to distinguish the cabling system associated with the switching device 440 from the data transmission lines connecting the antenna ports and the radio head ports to the antenna port connecting terminals and the radio head port connecting terminals of the switching device 440. However, like the data transmission lines, the switching cables may comprise any type of RF transmission line such as, for example, coaxial cables.

With respect to the MIMO configuration 442, the MIMO configuration 442 is shown by the solid lines in FIG. 4. The coupling, via the switching cables, between the antenna port connecting terminals and the radio head port connecting terminals for the MIMO configuration 442 is set forth in Table 1:

TABLE 1

MIMO Configuration

| Radio Head Port Connecting Terminal | Antenna Port Connecting Terminal |
|---|---|
| 1 | 1 |
| 2 | 5 |
| 3 | 3 |
| 4 | 7 |
| 5 | 2 |
| 6 | 6 |
| 7 | 4 |
| 8 | 8 |

In the MIMO configuration 442 for the first 4T/4R side 414, radio head ports 1 and 2 are communicatively coupled to the first antenna column 418 via the switching cables, and radio head ports 3 and 4 are communicatively coupled to the third antenna column 422 via the switching cables. Because the first antenna column 418 and the third antenna column 422 are separated by more than one wavelength and thus are not well correlated, this configuration of switching cables enables the first 4T/4R side 414 to transmit in the MIMO transmission mode.

Likewise, in the MIMO configuration 442 for the second 4T/4R side 416, radio head ports 5 and 6 are communicatively coupled to the second antenna column 420 via the switching cables, and radio head ports 7 and 8 are communicatively coupled to the fourth antenna column 424 via the switching cables. Because the second antenna column 420 and the fourth antenna column 424 are separated by more than one wavelength and also are not well correlated, this configuration of switching cables enables the second 4T/4R side 416 to additionally transmit in the MIMO transmission mode.

The switching cables of the switching device 440 may also be configured in the single-layer beam forming arrangement 444 as shown by the dashed line in FIG. 4. The coupling, via the switching cables, between the antenna port connecting terminals and the radio head port connecting terminals for single-layer beam forming is set forth in Table 2:

TABLE 2

Single-Layer Beam Forming Configuration

| Radio Head Port Connecting Terminal | Antenna Port Connecting Terminal |
|---|---|
| 1 | 1 |
| 2 | 2 |
| 3 | 3 |
| 4 | 4 |
| 5 | 5 |
| 6 | 6 |
| 7 | 7 |
| 8 | 8 |

In the single-layer beam forming arrangement 444 for the first 4T/4R side 414, radio head ports 1, 2, 3, and 4 are communicatively coupled to the +45° antenna elements 1, 2, 3 and 4 via the switching cables. Because the +45° antenna elements are well correlated, this configuration of switching cables enables the first 4T/4R side 414 to transmit in the single-layer beam forming mode.

Likewise, in the single-layer beam forming configuration 444 for the second 4T/4R side 416, radio head ports 5, 6, 7, and 8 are communicatively coupled to the −45° antenna elements 5, 6, 7, and 8 via the switching cables. Because the −45° antenna elements are well correlated, this configuration of switching cables enables the second 4T/4R side 416 to transmit in the single-layer beam forming mode.

The switching cables of the switching device 440 may also be configured in the dual-layer beam forming arrangement 446 as shown by the dotted line in FIG. 4. The coupling, via the switching cables, between the antenna port connecting terminals and the radio head port connecting terminals for dual-layer beam forming transmission mode is set forth in Table 3:

TABLE 3

Dual-Layer Beam Forming Configuration

| Radio Head Port Connecting Terminal | Antenna Port Connecting Terminal |
|---|---|
| 1 | 1 |
| 2 | 2 |
| 3 | 7 |
| 4 | 8 |
| 5 | 5 |
| 6 | 6 |
| 7 | 3 |
| 8 | 4 |

In the dual-layer beam forming arrangement 446 for the first 4T/4R side 414, radio head ports 1 and 2 are connected to the +45° antenna elements 1 and 2 via the switching cables, while radio head ports 3 and 4 are coupled to the −45° antenna elements 7 and 8. Thus transmission via the correlated +45° antenna elements occurs in one layer and transmission via the correlated −45° antenna elements occurs in a second layer.

Likewise, in the dual-layer beam forming configuration 444 for the second 4T/4R side, radio head ports 5 and 6 are communicatively coupled to −45° antenna elements 5 and 6, while radio head ports 7 and 8 are communicatively couple to +45° antenna elements 3 and 4 allowing transmission in two layers.

Although FIG. 4 depicts multiple lines connecting a given radio head port to a given antenna port (e.g., radio heard port 2 is shown as having two lines connecting it to antenna port 2), these multiple lines are used in an effort to depict the different transmission mode configurations. In practice, a single switching cable is used to connect a given radio head port to a given antenna port. Using radio head port 2 as an example, in practice there is only one switching cable connecting radio head port 2 to antenna port 2.

Each switching cable of the switching device 440 includes a switching unit (shown in detail in FIG. 5) that is used to selectively communicatively couple a respective radio head port to a given antenna port. At any single moment in time, the respective radio head port is communicatively coupled to only a single antenna port via a switching cable. A close-up view of the switching units associated with the radio head port connecting terminal 2 is shown in FIG. 5.

Figure 5:
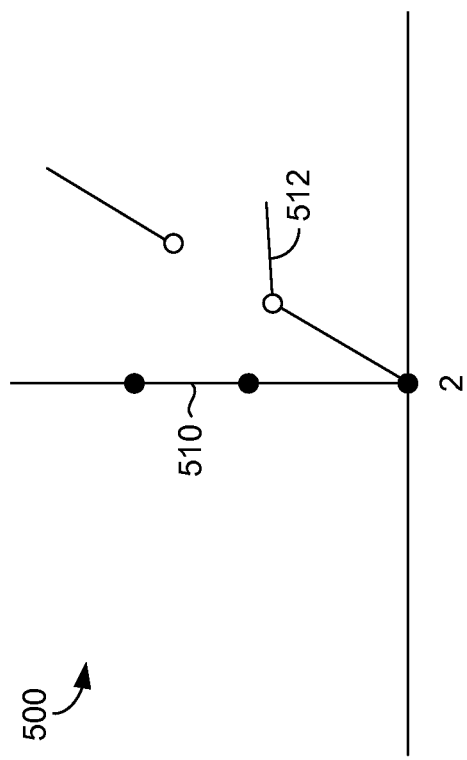
FIG. 5 depicts a close-up view of switching units associated with one of the switching cables of FIG. 4 suitable for practicing an embodiment of the technology.

FIG. 5 depicts a close-up view of the radio head port connecting terminal 2 of the switching device 440 as indicated on FIG. 4 and is referenced generally by the numeral 500. Each switching cable associated with radio head port connecting terminal 2 includes a switching unit such as switching unit 510 and switching unit 512. The depiction of the switching units 510 and 512 in FIG. 5 is meant to be illustrative and exemplary only. Other configurations of switching units are contemplated as being within the scope of the invention.

Only one of the switching units associated with the radio head port connecting terminal 2 is activated at any given time. For example, in FIG. 5, the switching unit 510 is currently engaged while the switching unit 512 is open. The result is that the radio head port connecting terminal 2 is currently communicatively coupled to, for example, antenna port connecting terminal 5 in the MIMO configuration 442 but is not communicatively coupled to the antenna port connecting terminal 2 in the single- or dual-layer beam forming configuration 444 or 446. As explained in more depth below with respect to FIGS. 7 and 8, selective switching units may be activated in response to inputs received from UEs served by the base station.

Figure 6:
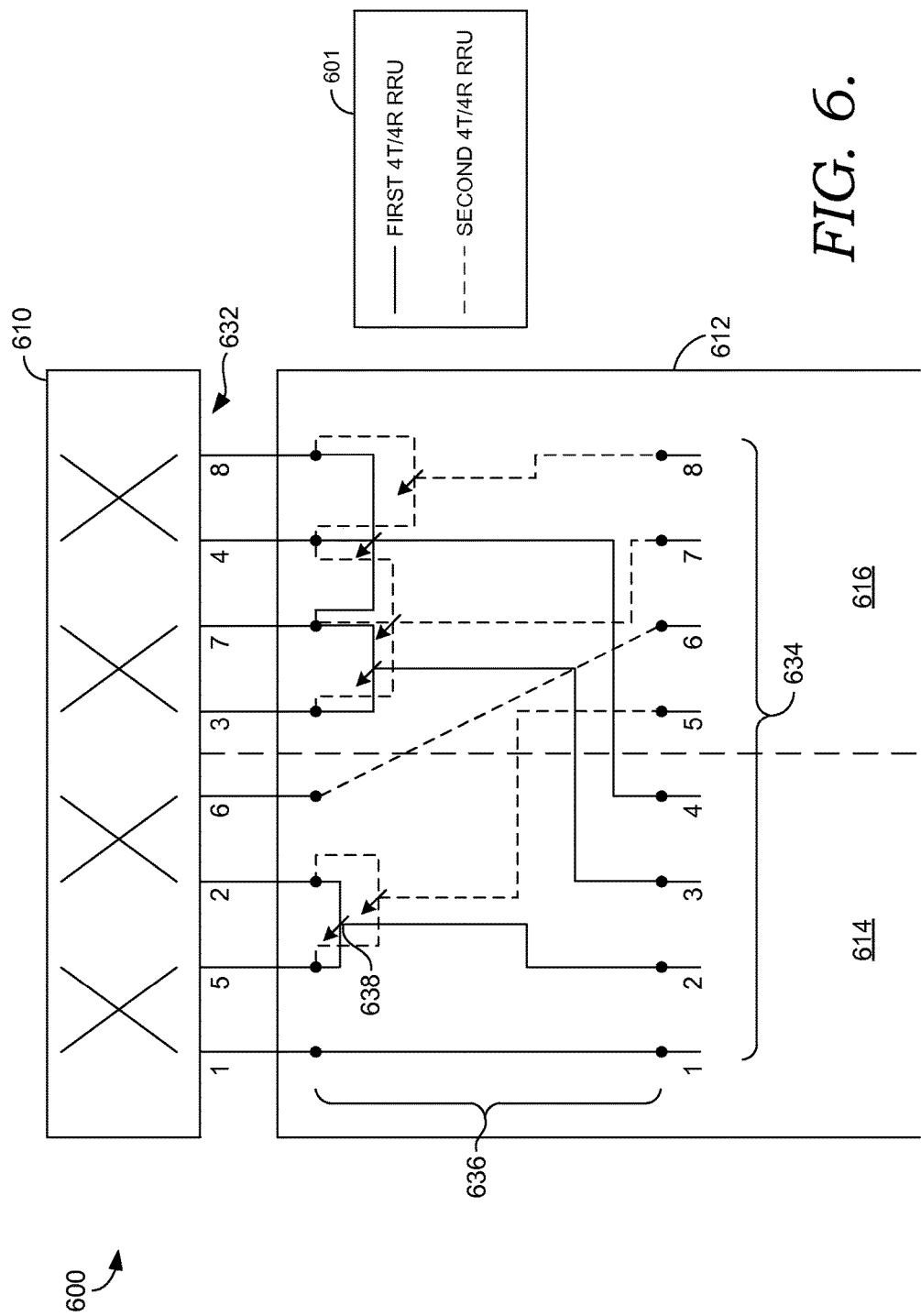
FIG. 6 depicts an exemplary switching device integrated into a remote radio unit where the switching device comprises a plurality of switching cables configured in a single-layer beam forming configuration, a dual-layer beam forming configuration, and a MIMO configuration suitable for practicing an embodiment of the technology.

FIG. 6 depicts another embodiment of the present invention. In FIG. 6, a switching device 636 is integrated into a split RRU 612. The split RRU 612 includes a first 4T/4R side 614 and a second 4T/4R side 616. The split RRU 612 is connected to an 8-port antenna 610. The RRU 612 and the antenna 610 have similar functionality as, for example, the split RRU 412 and the 8-port antenna 410 of FIG. 4. As shown by numeral 632, the antenna ports are numbered the same as the antenna ports of the antenna 410 of FIG. 4. Similarly, the radio head ports, shown by numeral 634, are numbered the same as the radio head ports of the RRU 412 of FIG. 4.

The switching device 636 has similar functionality as the switching device 440 of FIG. 4. As such, the switching device 636 includes a plurality of switching cables arranged in a MIMO configuration, a single-layer beam forming configuration, and a dual-layer beam forming configuration as explained above with respect to FIG. 4. As indicated in the legend 601, the switching cable configuration for the first 4T/4R side 614 is shown by a solid line, and the switching cable configuration for the second 4T4R side 616 is shown by the dashed line. Each 4T/4R side 614 and 616 is cabled to achieve a MIMO configuration, a single-layer beam forming configuration, and a dual-layer configuration. The configuration of the switching cables is the same as that set forth above for the switching device 440 of FIG. 4. For those radio head ports that are connected to more than one antenna port, a switching unit is utilized to switch from one configuration to another. For instance, with respect to radio head port 2, radio head port 2 is coupled to both antenna port 5 and antenna port 2 via switching cables. A switching unit 638 is associated with the switching cables and is used to communicatively couple radio head port 2 to one of the antenna ports 5 or 2 at any given time.

Figure 7:
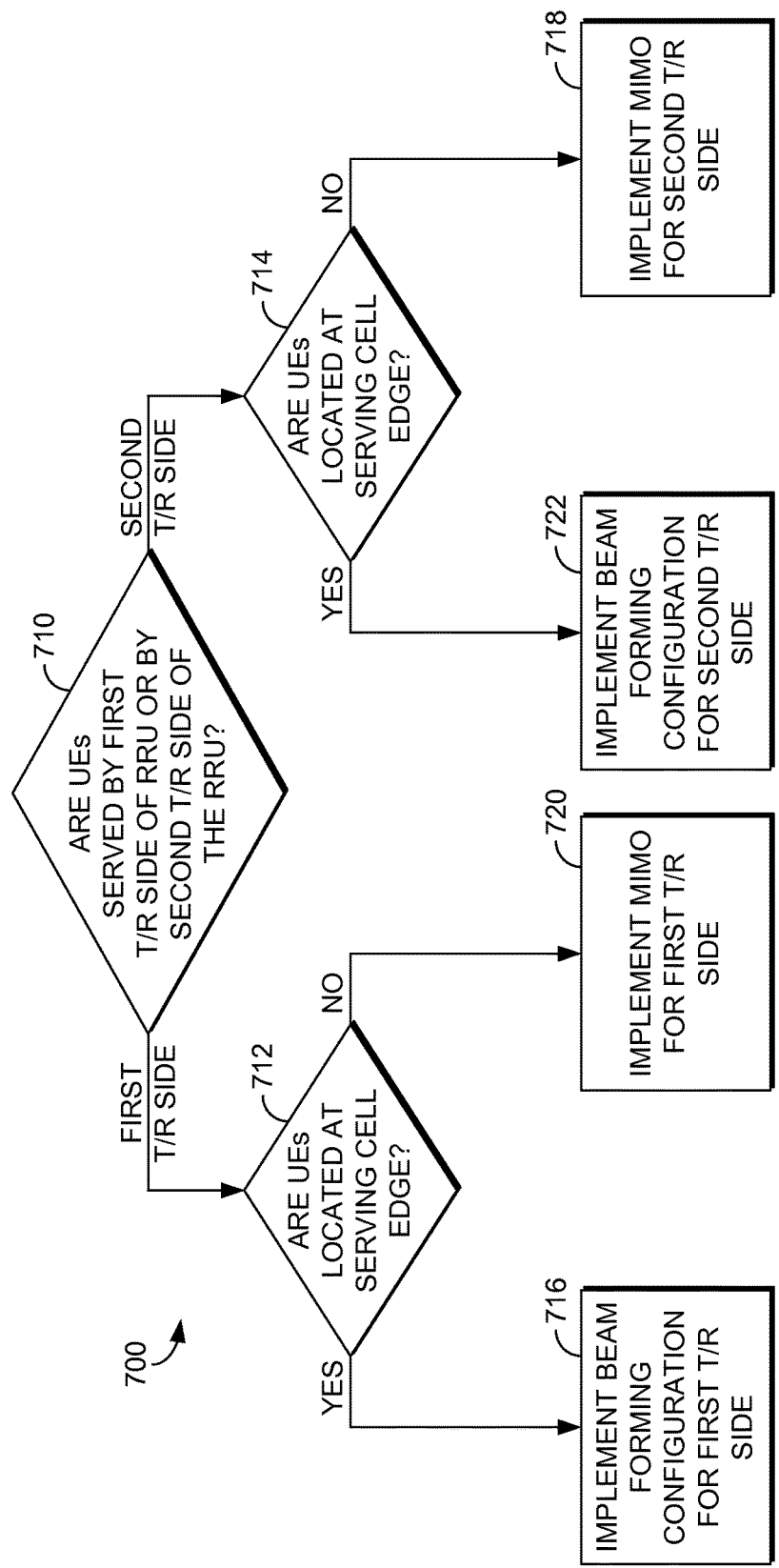
FIG. 7 depicts a flow diagram of an exemplary method of using inputs received from UEs served by a base station to select and implement via a switching device at least one of a MIMO transmission mode or a beam forming transmission mode according to an embodiment of the technology.

Turning now to FIG. 7, FIG. 7 depicts a flow diagram of an exemplary method 700 of implementing a predetermined configuration of switching cables of a switching device in order to affect a MIMO transmission mode, a single-layer beam forming transmission mode, or a dual-layer beam forming transmission mode in response to inputs received from UEs served by a base station. The switching device may be the same as the switching device 440 of FIG. 4 or the switching device 636 of FIG. 6. As such, the switching device may be a free-standing switching device that is positioned on the base station between an RRU and an 8-port antenna, or the switching device may be integrated into the RRU. The switching cables of the switching device selectively communicatively couple radio head ports of the RRU with antenna ports of the antenna. As explained above, the RRU may comprise an 8T/8R RRU that is split into a first 4T/4R side and a second 4T/4R side. The first 4T/4R side may carry a first set of RF channels and the second 4T/4R side may carry a second set of different RF channels.

At a step 710, a determination is made as to whether the UEs are served by the first 4T/4R side of the RRU, or whether the UEs are served by the second 4T/4R side of the RRU. If it is determined that the UEs are served by the first 4T/4R side, a determination is made at a step 712 whether the UEs are located at a serving cell edge or whether the UEs are located close to the base station. If it is determined that the UEs are located at the serving cell edge, then, at a step 716, the beam forming configuration is implemented for the first 4T/4R side. The beam forming configuration may comprise the single-layer beam forming configuration or the dual-layer beam forming configuration as explained more fully below with respect to FIG. 8. The beam forming configuration may be implemented by instructing the switching device to selectively communicatively couple, via the switching units associated with the switching cables, the radio head ports of the first 4T/4R side with corresponding antenna ports of the antenna as set forth in Tables 2 or 3. The use of a beam forming transmission mode in this type of situation helps to more effectively target UEs that are located at some distance from the base station.

If however, it is determined at the step 712 that the UEs are located close to the base station, then at a step 720, the MIMO configuration is implemented for the first 4T/4R side by instructing the switching device to selectively communicatively couple, via the switching units associated with the switching cables, the radio head ports of the first 4T/4R side with corresponding antenna ports of the antenna as set forth in Table 1. The use of a MIMO transmission mode when the UEs are located close to the base station helps to effectively target a greater number of UEs as compared to the beam forming transmission mode.

Returning to the step 710, when it is determined that the UEs are served by the second 4T/4R side, then similar to the first 4T/4R side, a determination is made at a step 714, whether the UEs served by the second 4T/4R side are located near a serving cell edge or are located close to the base station. If it is determined that the UEs are located near the serving cell edge then, at a step 718, the single- or dual-layer beam forming configuration is implemented for the second 4T/4R side. The beam forming configuration may be implemented by instructing the switching device to selectively communicatively couple, via the switching units associated with the switching cables, the radio head ports of the second 4T/4R side with corresponding antenna ports of the antenna as set forth in Tables 2 or 3.

If however, it is determined at the step 714 that the UEs are located close to the base station, then at a step 722, the MIMO configuration is implemented for the second 4T/4R side by instructing the switching device to selectively communicatively couple, via the switching units associated with the switching cables, the radio head ports of the second 4T/4R side with corresponding antenna ports of the antenna as set forth in Table 1.

The determination of which configuration of switching cables is implemented for the first 4T/4R side may be carried out independently of the determination of which configuration of switching cables is implemented for the second 4T/4R side. Thus, in some instances both the first and second 4T/4R sides may be implementing the same configuration, or, in other instance, the first 4T/4R side may be implementing a different configuration as compared to the second 4T/4R side.

Inputs received by the base station from the UEs may also include the rate of speed with which the UE is traveling through the serving cell. This information may also be used by the base station to determine which transmission mode is implemented by the switching device. For example, beam forming may not be as effective as MIMO when targeting UEs that are traveling at high speeds, such as highway speeds. Upon receiving inputs indicating that the UEs are traveling at high rates of speeds, the MIMO configuration may then be implemented by the switching device for the first or second 4T/4R side depending on which side is serving the UEs.

Additional information besides inputs from the UE may be used in the determination of which transmission mode is implemented via the switching device. For example, the topological morphology of the serving cell may be used to determine which transmission mode is implemented. This may be useful in cases of mobile base station that are set up in areas that have different topologies. If the topological morphology indicates that the serving area is relatively flat without a lot of buildings or other obstructions, then the switching device may be instructed by the base station to implement the beam forming configuration. By contrast, if the topological morphology of the serving area indicates that it is relatively hilly or has a lot of buildings or other obstructions, then the switching device may be instructed to implement a MIMO configuration.

Figure 8:
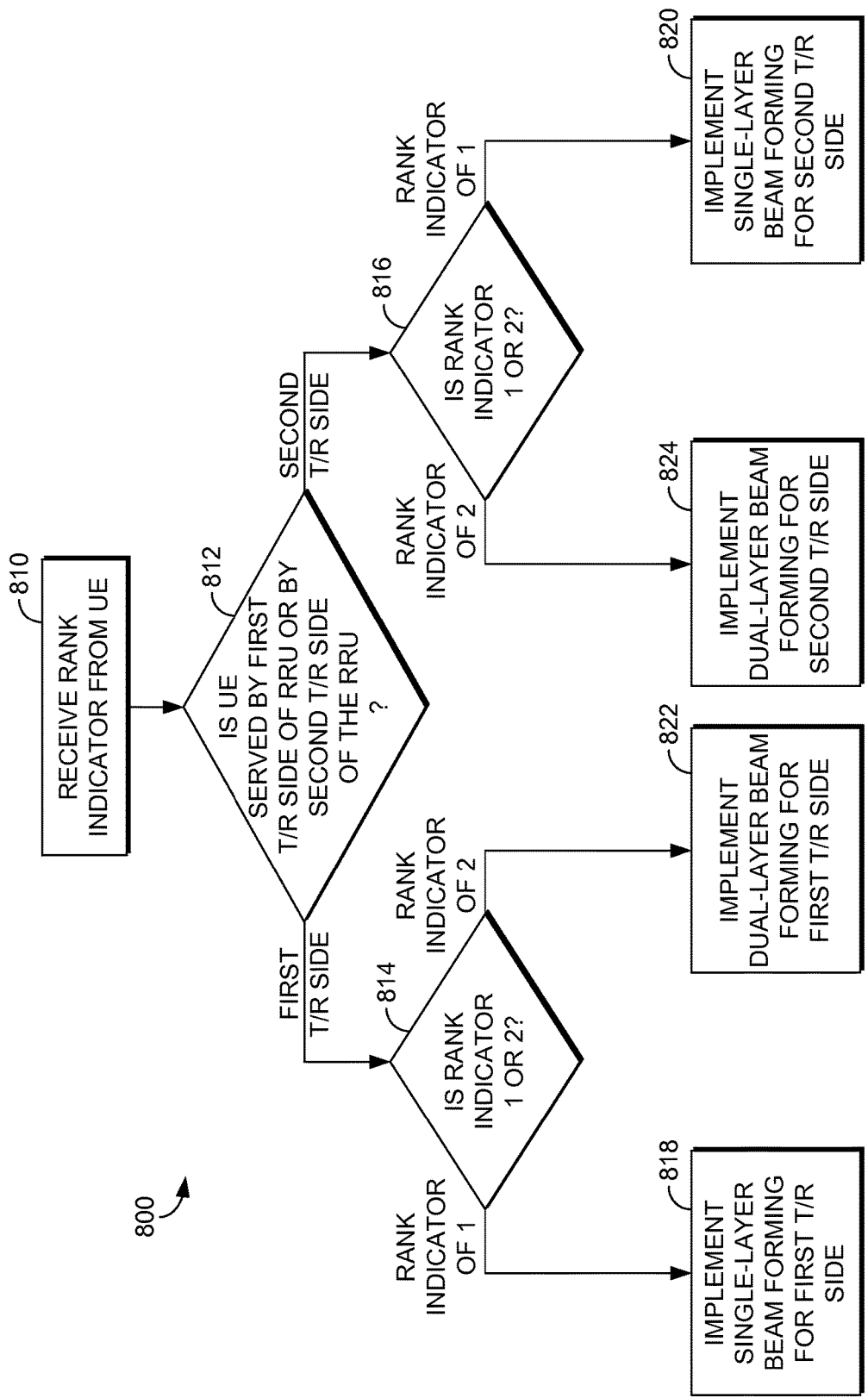
FIG. 8 depicts a flow diagram of an exemplary method of using rank indicators received from a UE served by a base station to select and implement via a switching device at least one of a single-layer beam forming transmission mode or a dual-layer beam forming transmission mode according to an embodiment of the technology.

Turning now to FIG. 8, a flow diagram is depicted of an exemplary method 800 of implementing either a single-layer beam forming transmission mode or a dual-layer beam forming transmission mode using switching cables of the switching device in response to the receipt of rank indicators from one or more UEs served by the base station. Rank indicators are used by the eNodeB in the selection of a transmission layer in downlink transmission. At a high level, rank indicators provide information on whether RF channel paths are correlated or not correlated. If channel paths are correlated, the UE transmits a rank indicator having a value of 1 to the base station. However, if the channel paths are not correlated, the UE transmits a rank indicator having a value of 2 to the base station.

At a step 810, the base station receives a rank indicator from a UE currently being served by the base station. At a step 812, a determination is made whether the UE is being served by the first 4T/4R side of the RRU or by the second 4T/4R side of the RRU. When it is determined that the first 4T/4R side of the RRU is serving the UE, then, at a step 814, it is determined whether the rank indicator has a value of 1 or a value of 2. When it is determined that the rank indicator has a value of 1, then, at a step 818, the single-layer beam forming configuration is implemented by the switching device for the first 4T/4R side of the RRU. However, if it is determined at the step 814, that the rank indicator has a value of 2, then, at a step 822, the dual-layer beam forming configuration is implemented by the switching device for the first 4T/4R side of the RRU.

Returning to the step 812, the same process is carried out for the second 4T/4R side of the RRU. For instance, if it is determined that the UE is being served by the second 4T/4R side of the RRU, then, at a step 816, a determination is made whether the rank indicator has a value of 1 or 2. If it is determined that the rank indicator has a value of 1, then, at a step 820, the base station implements the single-layer beam forming configuration for the second 4T/4R side of the RRU using the switching device. If it is determined that the rank indicator has a value of 2, then, at a step 824, the base station implements the dual-layer beam forming configuration for the second 4T/4R side of the RRU using the switching device.

Like the method 700, the determination of which configuration of switching cables is implemented for the first 4T/4R side may be carried out independently of the determination of which configuration of switching cables is implemented for the second 4T/4R side. Thus, in some instances both the first and second 4T/4R sides may be implementing the same configuration, or, in other instance, the first 4T/4R side may be implementing a different configuration as compared to the second 4T/4R side. Additionally, it is contemplated that more than one determination may be made of which configuration of switching cables should be implemented. For example, a first determination may be made to a implement beam forming configuration instead of a MIMO configuration depending on the location of the UEs in the serving cell. Next, a second determination may be made as to whether to implement single-layer beam forming or dual-layer beam forming depending on rank indicators received from the UE. The determinations made be made simultaneously or sequentially. Any and all such variations, and any combination thereof are contemplated as being within the scope of the invention.

The ability to switch between different transmission modes using predetermined configurations of switching cables facilitates the ability of the base station to more effectively target UEs being served by the base station, which, in turn, improves the network subscriber's experience. Additionally, because the split RRU is able to target a greater number of UEs, this improved experience is broadened over a greater number of network subscribers.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

What is claimed is:

1. One or more non-transitory computer-storage media having computer-executable instructions embodied thereon that, when executed, perform a method of configuring a plurality of switching cables of a switching device associated with a split remote radio unit (RRU) and an antenna of a base station, the method comprising:
   determining that a plurality of UEs is served by a first T/R side of the split RRU;
   monitoring one or more inputs received from the plurality of UEs to determine whether the plurality of UEs is transmitting/receiving at a serving cell edge of the base station, or whether the plurality of UEs is transmitting/receiving at a location close to the base station;
   upon determining that the plurality of UEs is transmitting/receiving at the serving cell edge, implementing a predetermined beam forming configuration for the first T/R side by communicatively coupling a plurality of radio head ports of the split RRU to a plurality of antenna ports of the antenna in a first predetermined pattern via the plurality of switching cables of the switching device; and
   upon determining that the plurality of UEs is transmitting/receiving at the location close to the base station, implementing a predetermined MIMO configuration for the first T/R side by communicatively coupling the plurality of radio head ports of the split RRU to the plurality of antenna ports of the antenna in a second predetermined pattern via the plurality of switching cables of the switching device.

2. The non-transitory media of claim 1, wherein the split RRU is an 8 transmit/8 receive (8T/8R) RRU, and wherein the first T/R side is a 4 transmit/4 receive (4T/4R).

3. The non-transitory media of claim 1, wherein the beamforming configuration and the MIMO configuration of the plurality of the switching cables is the same for the first T/R side and a second T/R side.

4. The non-transitory media of claim 1, wherein the beamforming configuration and the MIMO configuration of the plurality of the switching cables is different for the first T/R side compared to a second T/R side.

5. The non-transitory media of claim 1, further comprising:
monitoring the one or more inputs received from the plurality of UEs served by the base station to determine whether the plurality of UEs is traveling at high speeds, wherein upon determining that the plurality of UEs is traveling at high speeds, implementing the predetermined MIMO configuration for the first T/R side.

6. The non-transitory media of claim 1, further comprising:
determining morphological characteristics of the serving cell, wherein:
when the morphological characteristics indicate a relatively hilly terrain, implementing the predetermined MIMO configuration for the first T/R side; and
when the morphological characteristics indicate a relatively flat terrain, implementing the predetermined beam forming configuration for the first T/R side.

7. A computerized method carried out by at least one server having at least one processor for implementing a predetermined configuration of a plurality of switching cables of a switching device associated with a split remote radio unit (RRU) and an antenna of a base station, the method comprising:
determining whether the plurality of UEs is served by a first T/R side of the split RRU or by a second T/R side of the split RRU;
monitoring one or more inputs received from the plurality of UEs to determine whether the plurality of UEs is transmitting/receiving at a serving cell edge of the base station, or whether the plurality of UEs is transmitting/receiving at a location close to the base station, wherein:
when it is determined that the plurality of UEs is transmitting/receiving at the serving cell edge, implementing a beam forming configuration by communicatively coupling a plurality of radio head ports for either the first T/R side of the split RRU when the first T/R side is serving the plurality of UEs or the second T/R side of the split RRU when the second T/R side is serving the plurality of UEs to a plurality of antenna ports of the antenna in a first predetermined configuration via the plurality of switching cables; and
when it is determined that the plurality of UEs is transmitting/receiving at the location close to the base station, implementing a MIMO configuration by communicatively coupling the plurality of radio head ports for either the first T/R side of the split RRU when the first T/R side is serving the plurality of UEs or the second T/R side of the split RRU when the second T/R side is serving the plurality of UEs to the plurality of antenna ports of the antenna in a second predetermined configuration via the plurality of switching cables.

8. The method of claim 7, wherein the beam forming configuration is a single-layer beam forming configuration.

9. The method of claim 7, wherein the beam forming configuration is a dual-layer beam forming configuration.

10. The method of claim 7, wherein the split RRU is an 8 transmit/8 receive (8T/8R) RRU, and wherein the first T/R side is a 4 transmit/4 receive (4T/4R) side and the second T/R side is a 4T/4R side.

11. The method of claim 7, wherein the beam forming configuration and the MIMO configuration of the plurality of the switching cables is the same for the first T/R side and the second T/R side.

12. The method of claim 7, wherein the beam forming configuration and the MIMO configuration of the plurality of the switching cables is different for the first T/R side compared to the second T/R side.

13. The method of claim 7, further comprising:
monitoring the one or more inputs received from the plurality of UEs served by the base station to determine whether the plurality of UEs is traveling at high speeds, wherein when it is determined that the plurality of UEs is traveling at high speeds, implementing the MIMO configuration for either the first T/R side of the split RRU when the first T/R side is serving the plurality of UEs or the second T/R side of the split RRU when the second T/R side is serving the plurality of UEs.

14. The method of claim 7, further comprising:
determining morphological characteristics of the serving cell, wherein:
when the morphological characteristics indicate a relatively hilly terrain, implementing the MIMO configuration for the first T/R side and the second T/R side; and
when the morphological characteristics indicate a relatively flat terrain, implementing the beam forming configuration for the first T/R side and the second T/R side.

15. A computing system comprising:
a processor; and
computer storage memory having computer-executable instructions stored thereon which, when executed by the processor, facilitate a method for configuring a plurality of switching cables of a switching device associated with a split remote radio unit (RRU) and an antenna of a base station, the method comprising:
determining that a plurality of UEs is served by a first T/R side of the split RRU;
monitoring one or more inputs received from the plurality of UEs to determine whether the plurality of UEs is transmitting/receiving at a serving cell edge of the base station, or whether the plurality of UEs is transmitting/receiving at a location close to the base station, wherein:
upon determining that the plurality of UEs is transmitting/receiving at the serving cell edge, implementing a predetermined beam forming configuration for the first T/R side by communicatively coupling a plurality of radio head ports of the split RRU to a plurality of antenna ports of the antenna in a first predetermined pattern via the plurality of switching cables of the switching device; and
upon determining that the plurality of UEs is transmitting/receiving at the location close to the base station, implementing a predetermined MIMO configuration for the first T/R side by communicatively coupling the plurality of radio head ports of the split RRU to the plurality of antenna ports of the antenna in a second predetermined pattern via the plurality of switching cables of the switching device.

16. The system of claim 15, wherein the split RRU is an 8 transmit/8 receive (8T/8R) RRU, and wherein the first T/R side is a 4 transmit/4 receive (4T/4R).

17. The system of claim 15, wherein the predetermined beam forming configuration and the predetermined MIMO configuration of the plurality of the switching cables is the same for the first T/R side and a second T/R side.

18. The system of claim 15, wherein the predetermined beam forming configuration and the predetermined MIMO configuration of the plurality of the switching cables is different for the first T/R side compared to a second T/R side.

19. The system of claim 15, further comprising:
monitoring the one or more inputs received from the plurality of UEs served by the base station to determine whether the plurality of UEs is traveling at high speeds, wherein upon determining that the plurality of UEs is traveling at high speeds, implementing the predetermined MIMO configuration for the first T/R side.

20. The system of claim 15, further comprising:
determining morphological characteristics of the serving cell, wherein:
when the morphological characteristics indicate a relatively hilly terrain, implementing the predetermined MIMO configuration for the first T/R side; and
when the morphological characteristics indicate a relatively flat terrain, implementing the predetermined beam forming configuration for the first T/R side.

\* \* \* \* \*